Patented Jan. 17, 1933

1,894,365

UNITED STATES PATENT OFFICE

BERNHARD BOLLWEG, OF LEVERKUSEN-ON-THE-RHINE, AND LUDWIG ZEH, OF WIESDORF-ON-THE-RHINE, AND ERWIN KRAMER, OF COLOGNE-DEUTZ, GERMANY, ASSIGNORS TO GENERAL ANILINE WORKS, INC., OF NEW YORK, N. Y., A CORPORATION OF DELAWARE

BINAPHTHYLENEDIOXIDE COMPOUND

No Drawing. Application filed July 24, 1929, Serial No. 380,754, and in Germany July 28, 1928.

The present invention relates to a process of preparing symmetrically substituted binaphthylenedioxide compounds and to the new products obtainable thereby.

According to our invention, symmetrically substituted binaphthalenedioxide compounds being substituted by any substituents, with the exception of a sulfonic acid, the amino and the hydroxy group, are obtainable by oxidizing a 2-naphthol compound having free 1.8-positions and being otherwise substituted by at least one substituent, with the exception of the sulfonic acid, the amino and the hydroxy group, for example by a halogen, an alkyl, alkoxy, acylamino, the nitro, carboxylic acid, a carboxylic acid ester, carboxylic acid arylamide group or by the group

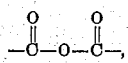

by means of a metallic oxide yielding oxygen under the condition of working, such as cupric oxide or pyrolusite, in an inert organic solvent having a boiling point of about at least 180° C., such as nitrobenzene, trichlorobenzene and the like. The quantity of the metallic oxide used in our process may be varied within wide limits, but, of course, for obtaining a good yield about at least a calculated amount of the metallic oxide must be present, the best results being obtained by working with a small excess. The temperature used in our process may range between about 180° C. and the boiling point of the solvent, the best results being obtained when working between about 180–220° C.

The reaction proceeds very smoothly and is complete as soon as the splitting off of water has ceased. Heating is continued until the water formed during the reaction has been distilled off. On cooling, the binaphthylene dioxide derivatives crystallize.

Instead of starting with a 2-naphthol compound having free 1.8-positions, one may start with a corresponding 2.2'-dihydroxy-1.1'-binaphthyl compound which is symmetrically substituted by any substituents, with the exception of the sulfonic acid, the amino and the hydroxy group. This modification of our process falls within the scope of our invention.

The reaction taking place may be represented by the following schematic equation:

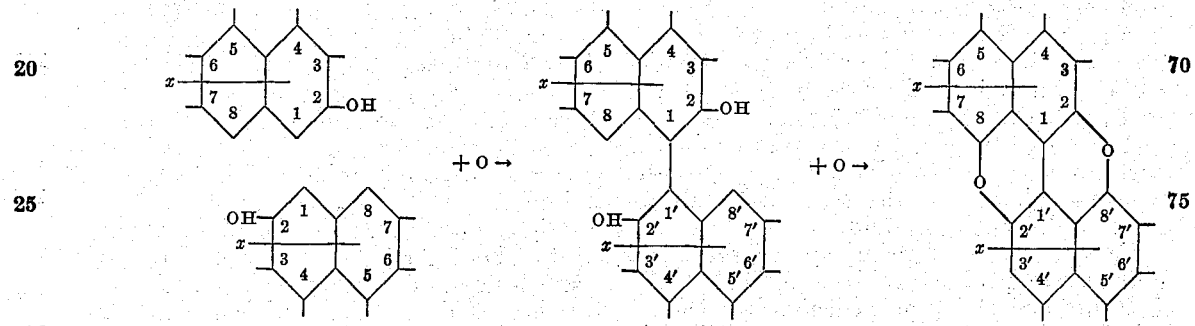

$x$ meaning any substituents, with the exception of $-SO_3H$, $-NH_2$, $-OH$, being symmetrically arranged in the binaphthol and binaphthylene dioxide.

The binaphthylene dioxide compounds thus prepared may be used as dyestuffs and as intermediate products in the manufacture of dyestuffs.

The invention is illustrated by the following examples, without being limited thereto:

*Example 1.*—13.9 parts by weight of 2.3-hydroxynaphthoic acid ortho toluidide are heated in 1700 parts by weight of nitrobenzene with 15 parts by weight of 86% pyrolusite while stirring. Heating of the mixture to the boiling point of the solvent is continued until the splitting off of water ceases. The reaction mixture is filtered while still hot and the di-o-toluidide of binaphthylene dioxide-3.3'-dicarboxylic acid crystallizes out from the filtrate on cooling. On recrystallizing from nitrobenzene yellow needles are obtained, which melt at about 398–400° C. and dissolve in sulfuric acid with a blue coloration.

In a similar manner there are obtained the corresponding dianilide, (melting point 370–372° C.) di-m-nitranilide, (melting point above 500° C.) di-p-anisidide (melting point 425–426° C.), di-α-naphthalide (melting point 415–416° C.), di-β-naphthalide (melting point 375–376° C.).

*Example 2.*—216 parts by weight of 2.6-hydroxynaphthoic acid ethylester are heated in 1000 parts by weight of boiling nitrobenzene with 300 parts by weight of cupric oxide until the splitting off of water ceases. After cooling, filtering and washing with alcohol the residue is boiled twice with 20% hydrochloric acid in order to remove the copper compounds. The residue remaining is recrystallized from nitrobenzene.

For the manufacture of the free acids the esters thus obtained are saponified with caustic alkali in alcoholic suspension;

100 parts by weight of the diethylester of binaphthylene dioxide-3.3'-dicarboxylic acid are mixed with 100 parts by weight of caustic potash in 1000 parts by weight of alcohol. The mixture is heated on the boiling water bath while stirring for several hours. After distilling off the alcohol the saponification product is dissolved in boiling water, the solution is filtered while hot and allowed to cool. The potassium salt of binaphthylene dioxide-3.3'-dicarboxylic acid crystallizes out in the form of brilliant yellow crystals.

The free acid can be precipitated in the form of a red crystalline powder from the aqueous solution of the potassium salt by means of hydrochloric acid.

*Example 3.*—214 parts by weight of 3-hydroxynaphthalic acid anhydride (see Berichte der Deutschen Chemischen Gesellschaft, volume 32, page 3283) are boiled in 2000 parts by weight of nitrobenzene with the addition of 300 parts by weight of cupric oxide while stirring until the reaction is finished. The coloration of the suspension changes from blackish brown to brown. The cooled reaction mixture is worked up as described in example 2. The crude 4.5.4'.5'-tetracarboxylic acid of binaphthylene dioxide is purified by dissolving it in hot dilute caustic soda and precipitating while boiling with hydrochloric acid. For analysis the anhydride produced is purified by redissolving in nitrobenzene; it forms a red crystalline powder which is soluble in sodium carbonate and caustic soda, but is very sparingly soluble even in boiling nitrobenzene. The anhydride dissolves with a red coloration in sulfuric acid. The melting point, which is not sharp, is approximately 360° C.

*Example 4.*—190 parts by weight of 6-methyoxy-2-naphthol are gradually heated while stirring to 200–205° C. with 300 parts by weight of cupric oxide and 2000 parts by weight of nitrobenzene. The reaction begins quickly. Heating is continued until the coloration of the liquid has changed from black to yellowish brown and water is no longer formed. After cooling and filtering the 6.6'-dimethoxy-binaphthylene dioxide is purified in the known manner. It crystallizes from high boiling solvents, such as trichlorobenzene, in the form of yellow needles, which melt at about 315–316° C. and dissolve with a yellow coloration in concentrated sulfuric acid. On treatment with saponifying agents, such as aluminium chloride, the yellow 6.6'-dihydroxy binaphthylene dioxide is obtained, which dissolves in dilute caustic soda with a yellow coloration and a bluish green fluorescence. The alkaline solution oxidizes in the air with the separation of a black precipitate.

*Example 5.*—263 parts by weight of 7-benzoylamino-2-naphthol are heated to 200–205° C. with 300 parts by weight of cupric oxide and 300 parts by weight of nitrobenzene until the splitting off of water ceases. The 7.7'-dibenzoylamino-binaphthylene dioxide produced is isolated in the customary manner and forms yellow prisms, which are very sparingly soluble in organic solvents, decompose without melting at about 370° C. and dissolve in sulfuric acid with a yellowish brown coloration. The coloration of the solution soon changes to violet and on the addition of pyrolusite becomes blue.

*Example 6.*—44.6 parts by weight of 6.6'-dibromo-2.2'-binaphthol obtainable by oxidizing 6-bromo-2-naphthol with ferric chloride are intimately mixed with 20 parts by weight of pyrolusite 87% and 400 parts by weight of nitrobenzene. The mixture is heated to about 200° C. while stirring, until water is no more split off. The reaction mixture is sucked while hot and from the filtrate 6.6'-dibromo-binaphthylene dioxide crystallizes in the form of small needles which can be recrystallized from nitrobenzene or trichlorobenzene. It is rather difficultly soluble in sulfuric acid with a pale greenish coloration. On the addition of pyrolusite to the sulfuric acid solution the coloration turns to a clear greenish-blue.

*Example 7.*—By oxidizing 37.6 parts by weight of 2.2'-binaphthol-7.7'-dicarboxylic acid (prepared by oxidizing 2-naphthol-7-carboxylic acid with ferric chloride) with 32 parts by weight of cupric oxide in 400 parts by weight of nitrobenzene there is obtained binaphthylenedioxide-7.7'-dicarboxylic acid, crystallizing in the form of yellow needles. It is soluble in diluted hot caustic soda lye with a yellow coloration and a blue fluorescence; in concentrated sulfuric acid it forms a beautiful red solution which coloration turns to bluish-violet by the addition of small quantities of pyrolusite.

*Example 8.*—38 parts by weight of a nitrocompound obtainable by nitrating 2.2'-binaphthol in glacial acetic acid solution, the nitro groups probably being in the 6.6' position yields by oxidation as described in one of the preceding examples 6.6'-dinitro binaphthylene dioxide. It is rather difficultly soluble in highly boiling solvents and crystallizes in the form of reddish-brown needles which are soluble in concentrated sulfuric acid with a reddish violet coloration, which coloration turns to blue on the addition of pyrolusite.

We claim:

1. The process which comprises boiling 3-hydroxy-naphthalic acid anhydride in nitrobenzene and in the presence of cupric oxide, until the formation of water ceases.

2. The process which comprises heating a 2-naphthol compound having free 1.8-positions and being at least once substituted by a substituent of the group consisting of halogen, alkyl, alkoxy, the nitro group, an acylamino group, the carboxylic acid group, a carboxylic acid ester group, a carboxylic acid arylamide group and the group

O=C—O—C=O, in an inert organic solvent of high boiling point at a temperature of about 180 to 220° C. and in the presence of a metallic oxide yielding oxygen under the conditions of working.

3. The process which comprises heating a 2-naphthol compound having free 1.8-positions and being at least once substituted by a substituent of the group consisting of halogen, alkyl, alkoxy, the nitro group, an acylamino group, the carboxylic acid group, a carboxylic acid ester group, a carboxylic acid arylamide group and the group

O=C—O—C=O, in an inert organic solvent of high boiling point at a temperature of about 180 to 220° C. and in the presence of a compound of the group consisting of cupric oxide and pyrolusite.

4. The process which comprises boiling a 2-naphthol compound having free 1.8-positions and being at least once substituted by a substituent of the group consisting of halogen, alkyl, alkoxy, the nitro group, an acylamino group, the carboxylic acid group, a carboxylic acid ester group, a carboxylic acid arylamide group and the group

O=C—O—C=O, in nitrobenzene and in the presence of cupric oxide.

5. The process which comprises heating a 2-naphthol compound having free 1.8-positions and being at least once substituted by a substituent of the group consisting of halogen, alkyl, alkoxy, the nitro group, an acylamino group, the carboxylic acid group, a carboxylic acid ester group, a carboxylic acid arylamide group and the group

O=C—O—C=O, in an inert organic solvent of high boiling point at a temperature of about 180 to 220° C. and in the presence of a metallic oxide yielding oxygen under the conditions of working, until the formation of water, which is split off in the course of the reaction, has ceased.

6. The process which comprises heating a 2-naphthol compound having free 1.8-positions and being at least once substituted by a substituent of the group consisting of halogen, alkyl, alkoxy, the nitro group, an acylamino group, the carboxylic acid group, a carboxylic acid ester group, a carboxylic acid arylamide group and the group

O=C—O—C=O, in an inert organic solvent of high boiling point at a temperature of about 180 to 220° C. and in the presence of a compound of the group consisting of cupric oxide and pyrolusite, until the formation of water, which is split off in the course of the reaction, has ceased.

7. The process which comprises boiling a 2-naphthol compound having free 1.8-positions and being at least once substituted by a substituent of the group consisting of halogen, alkyl, alkoxy, the nitro group, an acylamino group, the carboxylic acid group, a carboxylic acid ester group, a carboxylic acid arylamide group and the group

O=C—O—C=O, in nitrobenzene and in the presence of cupric oxide, until the formation of water which is split off in the course of the reaction has ceased.

8. As new products binaphthylene dioxides of the general formula:

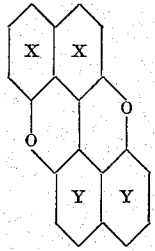

the naphthalene nuclei X and Y being equally and in symmetric positions substituted either of them at least once by a substituent of the group consisting of alkyl, alkoxy, acylamino, the carboxylic acid group, a carboxylic acid ester group, a carboxylic acid arylamide group and the group

9. As a new product binaphthylene dioxide-4.5.4'.5'-tetracarboxylic acid-anhydride, being a red crystalline powder, having a melting point of approximately 360° C., being sparingly soluble in organic solvents and soluble in sulfuric acid with a red coloration.

In testimony whereof we have hereunto set our hands.

BERNHARD BOLLWEG.
LUDWIG ZEH.
ERWIN KRAMER.